March 1, 1966  C. H. BRUNT  3,238,433
VARIABLE SPEED ELECTRIC MOTORS
Filed Dec. 17, 1962  3 Sheets-Sheet 1
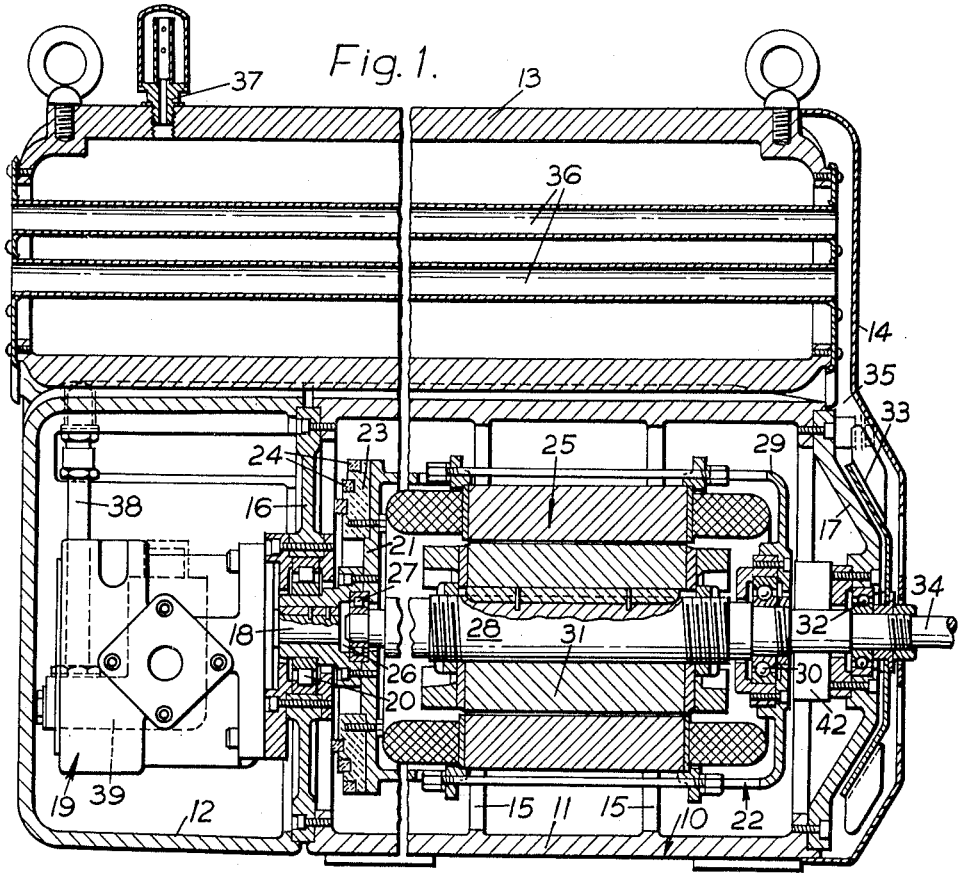
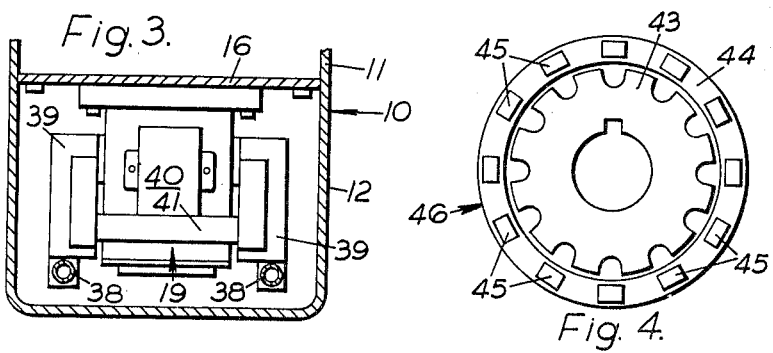
INVENTOR:
CHARLES HENRY BRUNT
BY *Kenwood Ross*
ATTORNEY March 1, 1966 C. H. BRUNT 3,238,433
VARIABLE SPEED ELECTRIC MOTORS
Filed Dec. 17, 1962 3 Sheets-Sheet 2
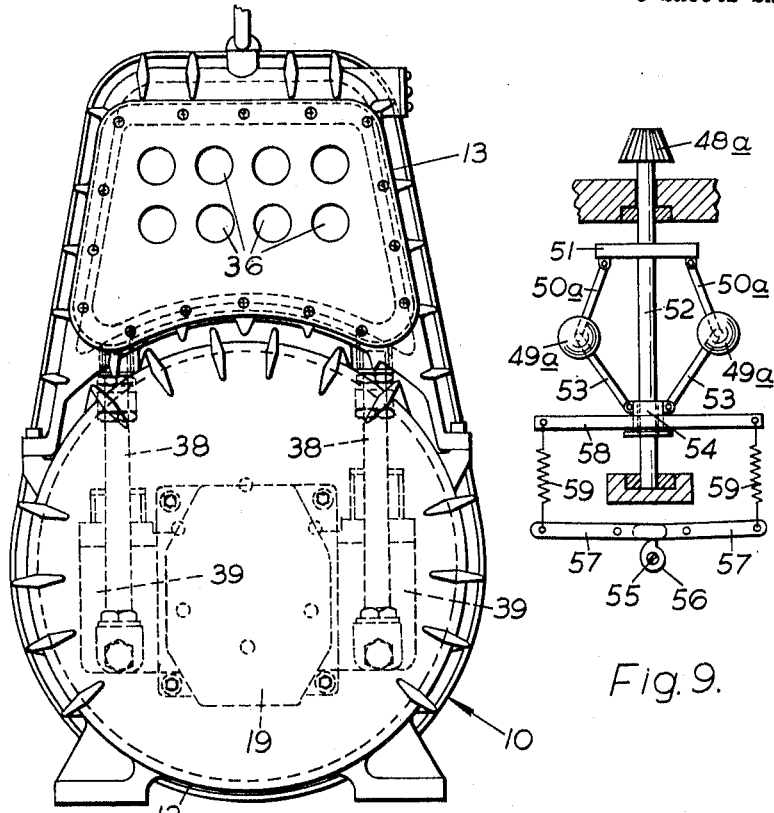
Fig. 2.
Fig. 9.
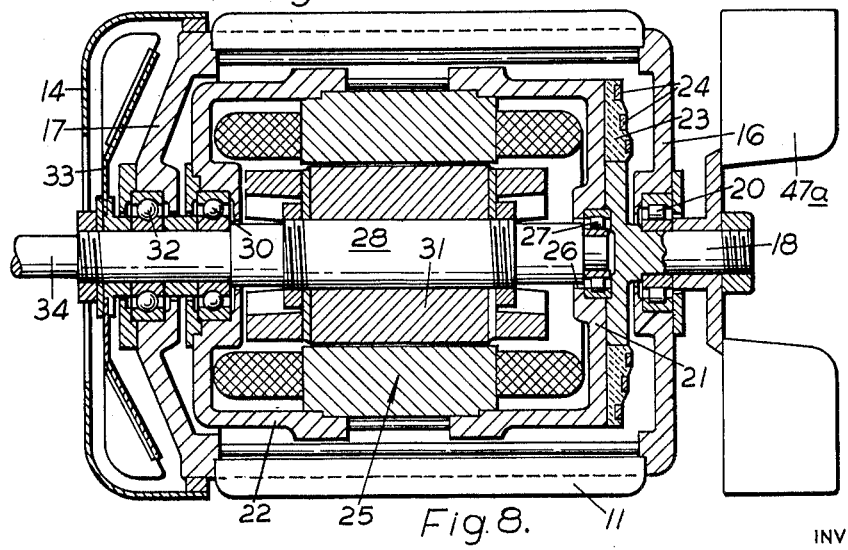
Fig. 8.
INVENTOR:
CHARLES HENRY BRUNT
BY Kenwood Ross
ATTORNEY.

March 1, 1966 C. H. BRUNT 3,238,433
VARIABLE SPEED ELECTRIC MOTORS
Filed Dec. 17, 1962 3 Sheets-Sheet 3
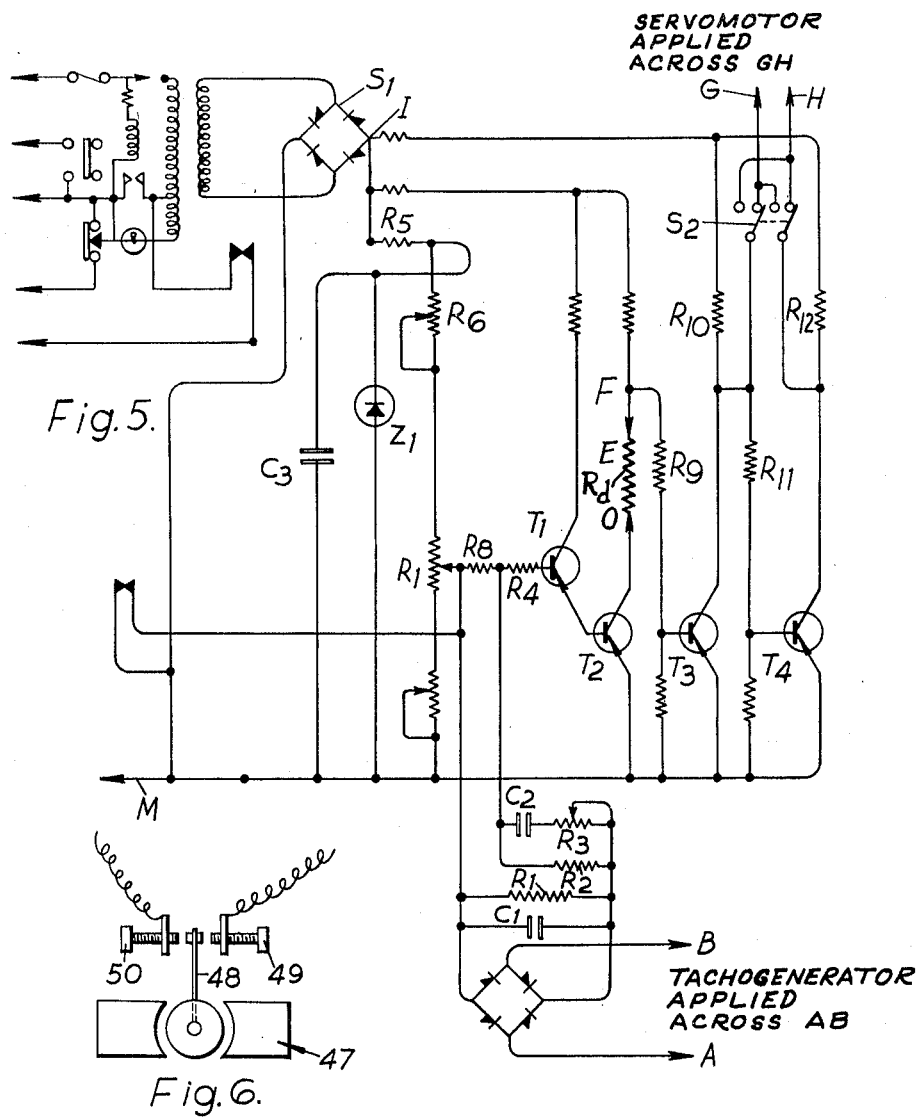
Fig. 5.
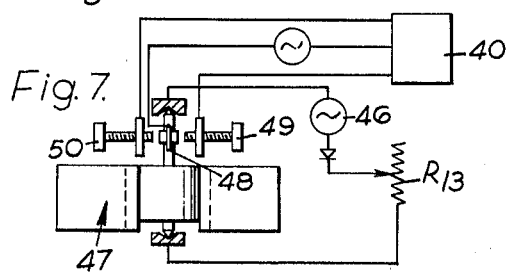
Fig. 6.
Fig. 7.
INVENTOR:
CHARLES HENRY BRUNT
BY Kenwood Ross
ATTORNEY.

United States Patent Office 3,238,433
Patented Mar. 1, 1966

3,238,433
VARIABLE SPEED ELECTRIC MOTORS
Charles H. Brunt, 197 Chamber Road,
Oldham, England
Filed Dec. 17, 1962, Ser. No. 245,079
Claims priority, application Great Britain, Dec. 16, 1961,
45,159/61
1 Claim. (Cl. 318—215)

This invention relates to variable speed electric motors of the "rotatable stator" type i.e. of the type wherein both the rotor and the stator are permitted to rotate. Such motors will be referred to, hereinafter, as "of the type described."

According to the present invention, there is provided a variable speed electric motor of the type described having means responsive to the speed of the rotor or of the stator the speed responsive means serving to actuate loading means whereby a load may be applied to either the rotor or the stator so as to vary the speed thereof.

The invention will be described further, by way of example, with reference to the accompanying drawings in which:

FIG. 1 is a vertical cross-section of a variable speed electric motor in accordance with the present invention;

FIG. 2 is an end elevation of the motor of FIG. 1;

FIG. 3 is a diagrammatic, detached, horizontal part section taken on the line 3—3 of FIG. 2 with certain elements added;

FIG. 4 is a diagrammatic view of a preferred form of tacho-generator constituting speed responsive means;

FIG. 5 is a circuit diagram of a preferred manner of operating loading means in response to the output of the speed responsive means;

FIGS. 6 and 7 are diagrammatic plan and side elevational views (FIGS. 7 including a circuit diagram) of a second means for operating the loading means;

FIG. 8 is a view of a second embodiment of electric motor in accordance with the present invention; and FIG. 9 is a diagrammatic view of a mechanical speed responsive means.

In the various drawings, where possible, like reference numerals have been used to indicate similar or equivalent parts.

A variable speed electric motor of the stator-rotating type and constructed in accordance with the present invention, is shown in FIGS. 1 to 3. The motor includes a casing 10 comprising a motor enclosing part 11, a pump and valve housing 12, a reservoir 13 and an air duct casing 14. The motor enclosing part 11 has ribs 15 on its side walls, for strength, and end plates 16, 17 support the rotating parts of the motor. The rear end plate 16 rotatably supports a stator shaft 18, which is coupled to a reversible hydraulic pump 19 in the housing 12, in bearings 20. The stator shaft 18 is secured to an end wall 21 of a stator casing 22. Secured to the end wall 21 is a mounting 23 for slip rings 24 whereagainst bushes (not shown) bear to conduct electricity to windings 25 of the stator. The end wall 21 also has an axially disposed recess 26 which rotatably receives, in bearings 27, one end of a rotor shaft 28.

The opposite end wall 29 of the stator casing 22 is mounted, through bearings 30, on the rotor shaft 28 so that the stator is rotatable in the motor enclosing part 11 of the casing 10.

The rotor shaft 28 has a squirrel cage armature 31 mounted thereon and, at its end remote from the recess 26, is journalled in bearings 32 in the front end plate 17 of the part 11 and projects therethrough.

A circulating fan 33 is secured to the projecting part of the rotor shaft 28 within the air duct casing 14 which latter is apertured in the vicinity of the fan to permit air to be drawn into the casing 14.

The projecting end of the rotor shaft 28 provides an output shaft 34.

The air duct casing provides an air flow passage 38, to tubes 36 which extend longitudinally through the reservoir 13 so that air flowing therethrough may extract heat from fluid in the reservoir. The reservoir has a filler and overflow or vent cap 37 and two flow tubes 38 which conduct fluid from the reservoir to the pump 19 and back to the reservoir. The two flow tubes open into respective valves 39 secured to the inlet and outlet of the pump.

The pump is reversible so as to be operable in either direction of rotation of the stator of the electric motor.

The valves 39 are operable either together or singly in which case the valve on the positive pressure side of the pump is the one that is operated.

A servo-motor 40 is mounted on the pump 19 and carries a pinion (not shown) on its output shaft. The pinion meshes with a rack (also not shown) supported in slides in a rack housing 41 which is secured to the pump 19.

The rack, at each end, is connected to a respective valve operating lever so that movement of the rack in one direction, fully opens one valve and moves the other valve to a desired partly closed postion and vice versa.

Keyed onto the rotor shaft 28, for example, at the position indicated by reference numeral 42, is a multipolar permanent magnet 43 (see FIG. 4). The magnet 43 constitutes the armature of a tachogenerator 46, of which the stator comprises a surrounding frame 44, secured against rotation, having a plurality of individual coils 45.

The coils are so connected, in series and/or in parallel so as to give an optimum voltage of a relatively high frequency.

The output from the tachogenerator 46 is fed into a circuit similar to that shown in FIG. 5 at the points A and B.

The voltage applied is full wave rectified and smoothed by resistance $R_1$ and condenser $C_1$. One line from the rectifier includes a resistance $R_2$ and, in parallel therewith, a variable resistance $R_3$ and a condenser $C_2$. This acts as a voltage rate of change indicator and effectively reduces any hunting which may occur. The other line from the rectifier is stabilised at the reference voltage of line M. The unstabilised line from the rectifier is fed to the base of a transistor $T_1$, through a resistance $R_4$, whereat it is compared with a predetermined stabilised reference voltage supplied from a full wave rectified and smoothed source $S_1$ through resistance $R_5$, variable resistance $R_6$, variable resistance $R_7$ and resistance $R_8$, a smoothing condenser $C_3$ and a breakdown or zener diode $Z_1$ each being in parallel with the source $S_1$. The voltage on the base of transistor $T_1$ varies the emitter/base current of such transistor and hence the collector/emitter current of a second transistor $T_2$ in cascade therewith. The output of the second transistor $T_2$ is interruptible at points O, E and a dropping resistor $R_d$ is connected between points E and O, the value of which is dependent on the values of the components of the circuit and may vary from a nul-value, to reduce as required the output from the second transistor $T_2$. Whether a dropping resistor is or is not included in the circuit, the potential at the point F is applied, through resistance $R_9$ to the base of output transistor $T_3$. The output of transistor $T_3$ is compared with an opposing voltage from the source $S_1$ through resistance $R_{10}$ and, if the potential is high enough, a current will flow through switch $S_2$ and from point G to the armature of the servo-motor 40 returning therefrom to point H to complete the circuit. If the output of transistor $T_3$ is sufficiently high, a transistor $T_4$ differentially arranged therewith is biased through resistance $R_{11}$ to a non-conducting state. If, however, the output from transistor $T_3$ is not sufficient to cause current to flow in the servo-motor armature, the bias on transistor $T_4$ no longer exists and current can flow therein. However, the output therefrom is compared with an opposing voltage from the source $S_2$ through resistance $R_{12}$ and it is arranged that, in the steady state, no current flows in the armature of the servo-motor. A steady voltage is applied to the field of the servo-motor from base line M and from point I.

It will be appreciated that, by varying $R_6$, the steady state can be achieved at desired outputs of the tachogenerator 46 i.e. at desired speeds of the rotor shaft 28. Varying resistance $R_3$ serves to increase or to lessen hunting and change-over switch $S_2$ is employed on reversal of the motor.

The mains input is full wave rectified by a bridge circuit with one pole held at M; this supplies M with a rectified mains ripple superimposed. $R_5$, $R_6$, $R_7$ and $C_3$ provide a smoothing circuit to eliminate the mains ripple effect and produce a steady voltage.

With such a circuit, it is possible to control the speed of the rotor shaft to between 2% and 4% of a desired value.

The invention is not confined to the precise details of the foregoing example and variations may be made thereto. For instance, and as shown in FIGS. 6 and 7, a much simpler servo-motor operating circuit can be employed. In this instance, the output of the tachogenerator 46 is rectified and is passed to a moving coil flip-flop 47. A contact arm 48 engages with one or the other of two adjustable contacts 49, 50 and thus directs current to the servo-motor 40 to rotate the armature of the latter and to operate the valve operating levers in the desired manner.

A suitable spring loading is used to act against rotation of the coil. A variable resistance $R_{13}$ is provided so that an appropriate speed setting can be given to the speed responsive means.

FIG. 8 indicates a second embodiment of a stator-rotated electric motor in accordance with the present invention. The construction of the motor is similar to that shown in FIGS. 1 and 2 except that, instead of being coupled to a hydraulic pump, it is connected to an air fan 47a of the centrifugal type. The output of a tachogenerator or like speed responsive means (not shown but similar to the tachogenerator 46) is employed to control the movement of a casing (not shown) surrounding the fan so that the air flow is restricted and the load on the stator, by the fan is increased.

An alternative loading of the stator can be effected by having a permanent magnet carrying member in place of the fan. The speed responsive means can then be employed to move other radially located permanent magnets towards or away from the permanent magnets on the member which latter is, of course, rotatable with the stator. The proximity of the radially located permanent magnets thus varies the load on the stator.

In yet another embodiment, an applied use of the variable speed electric motor is in driving two bobbin winding spindles, one by the rotor and one by the stator. If it is arranged that the bobbins should be wound out of phase, i.e. one bobbin being half full wilst the other is empty and vice versa, then the load on the rotor or the stator will be inversely proportional to the desired speed of rotation thereof. This is particularly useful as, if a constant rate of wind-on of yarn is achieved, there is less likelihood of the yarn breaking. Thus, if a bobbin is empty or only partly full, it will, by loading the rotor or the stator (depending upon to which its spindle is coupled), rotate faster than a half or nearly full bobbin coupled to the complementarily rotating part of the motor and hence the rate of yarn wind-on is nearly constant.

FIG. 9 shows a second embodiment of a speed responsive means. The means, as shown, is entirely mechanical and is a modified form of a centrifugal governor. The governor is driven, for example, through bevel gearing 48a and, on rotation, the balls 49a tend to fly outwardly. The balls are connected, by links 50a to a fixed flange 51 on the governor shaft 52 and by links 53 to a sleeve 54 slidable on the shaft 52. The sleeve 54 is mechanically coupled to, for example, the valve operating levers (should the governor be employed on the arrangement of FIGS. 1 and 2) or to a casing of a fan or to a slide of a radially located permanent magnet (depending on the embodiment to which it is applied) so that movement of the sleeve acts on the means for varying the loading of the stators as required.

However, a simple governor is suitable for only one speed and hence the governor shown is modified by a variable spring loading on the sleeve 54. A cam shaft 55 is disposed below the governor and carries a plurality of cams 56, each cam acting on one arm of a respective two armed lever 57, the other arm of which lever is connected to a plate 58 carried by the sleeve 54 through a respective tension spring 59. Rotation of the cam shaft 55 brings one or more of the cams 56 to bear on their respective levers whereby to increase or decrease the spring loading on the sleeve 54.

The invention is, as aforesaid, not confined to the precise details of the foregoing example and many variations may be made thereto within the scope of the appended claim.

I claim:

A squirrel cage motor and control therefor comprising: a primary and a secondary both mounted for rotation; means responsive to rotation of said primary for providing a signal representative of the speed of rotation of said primary; means for comparing the signal with a datum; loading means externally operable of said secondary and responsive to said comparison means; an output shaft connected with said primary; said speed responsive means being a tachogenerator having a multi-polar permanent magnet splined to said output shaft and a surrounding stationary member carrying a plurality of separate coils; a rectifier to which the output of said tachogenerator is passed for rectification; the output of the tachogenerator after rectification being fed to a moving coil type flip-flop having a contact arm with the flip-flop depending on the position of the contact arm thereof for supplying power to a servomotor operatively connected to said secondary; the servomotor acting to vary the load applied to said secondary.

References Cited by the Examiner
UNITED STATES PATENTS

| | | | |
|---|---|---|---|
| 1,442,042 | 1/1923 | Boddie | 318—39 X |
| 2,762,939 | 9/1956 | Hodgson | 310—115 X |
| 2,931,928 | 4/1960 | Fehn | 310—115 X |
| 3,079,518 | 2/1963 | Moore | 310—115 |

ORIS L. RADER, *Primary Examiner.*

S. GORDON, G. Z. RUBINSON, *Assistant Examiners.*